US012706823B2

(12) United States Patent
Verma et al.

(10) Patent No.: US 12,706,823 B2
(45) Date of Patent: Aug. 11, 2026

(54) IN-BAND TELEMETRY FOR SRV6-TE TUNNEL SEGMENTS

(71) Applicant: Ciena Corporation, Hanover, MD (US)

(72) Inventors: Pankaj Verma, Kanpur (IN); Aditya Mittal, Gurgaon (IN); Sudipta Das, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 274 days.

(21) Appl. No.: 18/619,283

(22) Filed: Mar. 28, 2024

(65) Prior Publication Data

US 2025/0260634 A1 Aug. 14, 2025

(30) Foreign Application Priority Data

Feb. 14, 2024 (IN) ............................ 202411010220

(51) Int. Cl.
*H04L 43/0852* (2022.01)
*H04L 43/10* (2022.01)

(52) U.S. Cl.
CPC .......... *H04L 43/0852* (2013.01); *H04L 43/10* (2013.01)

(58) Field of Classification Search
CPC .... H04L 43/106; H04L 43/10; H04L 43/0852
See application file for complete search history.

(56) References Cited

U.S. PATENT DOCUMENTS 11,108,689 B1 8/2021 Aggarwal et al.
11,777,840 B2 10/2023 Sharma et al.
2018/0212828 A1 7/2018 Sekhri et al.
2020/0127909 A1 4/2020 Mittal et al.
2021/0036910 A1* 2/2021 Holness .................. H04L 69/40
2021/0250284 A1 8/2021 Aggarwal et al.
2022/0407802 A1* 12/2022 Xiao ....................... H04L 45/50
2023/0141362 A1 5/2023 Mittal et al.
2023/0246933 A1 8/2023 Das et al.
2024/0430189 A1* 12/2024 Filsfils ................ H04L 43/0829

OTHER PUBLICATIONS

S. Shalunov et al., "A One-way Active Measurement Protocol (OWAMP)," Network Working Group, Category: Standards Track, RFC 4656, Sep. 2006, pp. 1-56.

(Continued)

*Primary Examiner* — Sulaiman Nooristany

(74) *Attorney, Agent, or Firm* — Baratta Law PLLC; Lawrence A. Baratta, Jr.

(57) ABSTRACT

Systems and methods provide in-band telemetry for Segment Routing over Internet Protocol version 6 (SRv6) Traffic Engineering (TE) tunnel segments, such as using One-Way Active Measurement Protocol (OWAMP), Two-Way Active Measurement Protocol (TWAMP), Simple Two-Way Active Measurement Protocol (STAMP), and the like. A method includes receiving a packet in a Segment Routing network supporting Segment Routing over SRv6 for an SRv6-TE tunnel; determining the packet includes a Segment Routing Header (SRH) with an Operations, Administration, and Maintenance (OAM) Flag (O-Flag) enabled; performing measurements based on the packet being an OAM packet and based on the O-Flag being enabled; and storing the measurements in an OAM session database.

18 Claims, 9 Drawing Sheets

(56) References Cited

OTHER PUBLICATIONS

K. Hedayat et al., "A Two-Way Active Measurement Protocol (TWAMP)," Network Working Group, Category: Standards Track, RFC 5357, Oct. 2008, pp. 1-26.
C. Filsfils et al., "Segment Routing Architecture," Internet Engineering Task Force (IETF), Category: Standards Track, ISSN: 2070-1721, RFC 8402, Jul. 2018, pp. 1-32.
C. Filsfils et al., "IPv6 Segment Routing Header (SRH)," Internet Engineering Task Force (IETF), Category: Standards Track, ISSN: 2070-1721, RFC 8754, Mar. 2020, pp. 1-27.
G. Mirsky et al., "Simple Two-Way Active Measurement Protocol," Internet Engineering Task Force (IETF), Category: Standards Track, ISSN: 2070-1721, RFC 8762, Mar. 2020, pp. 1-15.
Z. Ali er al., "Operations, Administration, and Maintenance (OAM) in Segment Routing over IPv6 (SRv6)," Internet Engineering Task Force (IETF), Category: Standard Tracks, ISSN: 2070-1721, RFC 9259, Jun. 2020, pp. 1-19.

* cited by examiner

IN-BAND TELEMETRY FOR SRV6-TE TUNNEL SEGMENTS

FIELD OF THE DISCLOSURE

The present disclosure relates generally to networking and computing. More particularly, the present disclosure relates to systems and methods for in-band telemetry for Segment Routing over Internet Protocol version 6 (SRv6) Traffic Engineering (TE) tunnel segments, such as using One-Way Active Measurement Protocol (OWAMP), Two-Way Active Measurement Protocol (TWAMP), Simple Two-Way Active Measurement Protocol (STAMP), and the like.

BACKGROUND OF THE DISCLOSURE

Segment Routing (SR) is a technology that implements a source routing paradigm. A packet header includes a stack of function identifiers, known as segments, which define an ordered list of functions to be applied to the packet. A segment can represent any instruction, topological, or service-based, and each segment is represented by a Segment Identifier (SID). Segment Routing is described, e.g., in RFC 8402, "Segment Routing Architecture," Internet Engineering Task Force (IETF), July 2018, the contents of which are incorporated herein by reference. In Segment Routing, a path includes segments which are instructions a node executes on an incoming packet. Segment Routing works on top of either a Multiprotocol Label Switching (MPLS) network (referred to as SR-MPLS) or an Internet Protocol version 6 (IPv6) network (referred to as SRv6). In SR-MPLS, the segments are encoded as MPLS labels, and, in SRv6, the segments are encoded in a Segment Routing Header (SRH) as a list of IPV6 addresses.

Also, in network operation, telemetry monitoring is a key requirement for service providers to maintain a continuous, real-time view of network behavior. In a SRv6 network, this includes maintaining a real-time view of any TE tunnels. Telemetry is also referred to as Operations, Administration, and Maintenance (OAM), and generally includes periodic measurements performed in-band in the data path, i.e., OAM packets sent to determine an associated measurement.

BRIEF SUMMARY OF THE DISCLOSURE

The present disclosure relates to systems and methods for in-band telemetry for SRv6-TE tunnel segments, such as using OWAMP, TWAMP, STAMP, and the like. Conventionally, there is no solution available which satisfies the following measurement criteria:

(1) In-band delay measurement at the SRv6-TE tunnel level for all hops (i.e., between nodes, i.e., network elements) in the tunnel path;

(2) Request-Response mechanism built-in into the protocol for bi-directional paths;

(3) Minimal wait-time at initiator node and latency at all nodes; and (4) Minimal configuration overhead over the entire path, including transit hops.

The present disclosure addresses the above measurement criteria in various embodiments using an OAM flag (referred to as an O-Flag) in the SRH. The O-Flag is defined in RFC 9259, "Operations, Administration, and Maintenance (OAM) in Segment Routing over IPv6 (SRv6)," June 2022, the contents of which are incorporated by reference. The O-Flag is located in the flag section of the SRH and is used to perform controllable and predictable flow sampling from segment endpoints, i.e., the end nodes of the SRv6-TE tunnel. In the present disclosure, the O-Flag is used to enable measurements at each transit node, which is SRv6 aware and capable, via a single OAM packet, along the SRv6-TE tunnel, as opposed to just at the endpoints.

In an embodiment, a node is configured to operate in a Segment Routing network supporting Segment Routing over Internet Protocol version 6 (SRv6). The node includes circuitry configured to receive a packet in a Segment Routing network supporting Segment Routing over Internet Protocol version 6 (SRv6) for an SRv6-Traffic Engineering (TE) tunnel, determine the packet includes a Segment Routing Header (SRH) with an Operations, Administration, and Maintenance (OAM) Flag (O-Flag) enabled, perform measurements based on the packet being an OAM packet and based on the O-Flag being enabled, and store the measurements in an OAM session database. The circuitry can be further configured to, subsequent to the determination the SRH has the O-Flag enabled and concurrent with the measurements, transmit a mirror copy of the packet to a next hop in the SRv6-TE tunnel. The circuitry can be further configured to transmit a reply to an initiator node of the packet with information based on the measurements. The circuitry can be further configured to provide a response to a request to fetch the measurements or information based thereon. The packet can be associated with One-Way Active Measurement Protocol (OWAMP), and the measurements include determining a difference between a timestamp in the packet and a local time. The packet can be associated with one of (1) Two-Way Active Measurement Protocol (TWAMP) and (2) Simple Two-Way Active Measurement Protocol (STAMP), and the measurements include determining local timestamps and providing the local timestamps in a reply. The node can be an intermediate node in the SRv6-TE tunnel.

In another embodiment, a method includes steps of receiving a packet in a Segment Routing network supporting Segment Routing over Internet Protocol version 6 (SRv6) for an SRv6-Traffic Engineering (TE) tunnel; determining the packet includes a Segment Routing Header (SRH) with an Operations, Administration, and Maintenance (OAM) Flag (O-Flag) enabled; performing measurements based on the packet being an OAM packet and based on the O-Flag being enabled; and storing the measurements in an OAM session database. The steps can further include, subsequent to the determining and concurrent with the performing, transmitting a mirror copy of the packet to a next hop in the SRv6-TE tunnel. The steps can further include transmitting a reply to an initiator node of the packet with information based on the measurements. The steps can further include providing a response to a request to fetch the measurements or information based thereon. The packet can be associated with One-Way Active Measurement Protocol (OWAMP), and the measurements include determining a difference between a timestamp in the packet and a local time. The packet can be associated with one of (1) Two-Way Active Measurement Protocol (TWAMP) and (2) Simple Two-Way Active Measurement Protocol (STAMP), and the measurements include determining local timestamps and providing the local timestamps in a reply. The method can be implemented in an intermediate node in the SRv6-TE tunnel.

In a further embodiment, a non-transitory computer-readable medium stores instructions that, when executed, cause one or more processors to, based on Operations, Administration, and Maintenance (OAM) measurements in a Segment Routing network supporting Segment Routing over Internet Protocol version 6 (SRv6) for one or more SRv6-Traffic Engineering (TE) tunnels, receive information based on measurements over the one or more SRv6-Traffic Engineering (TE) tunnels, the measurements utilizes OAM packets with a Segment Routing Header (SRH) with an Operations, Administration, and Maintenance (OAM) Flag (O-Flag) enabled therein, and store and utilize the information for traffic engineering over the one or more SRv6-TE tunnels. The OAM measurements can include, at intermediate nodes along the one or more SRv6-TE tunnels, performing a measurement and concurrently transmitting a mirror copy of an OAM packet to a next hop in the one or more SRv6-TE tunnels. The OAM measurements can include transmission of a reply to the packet to an initiator node of an OAM packet with information based on the measurements. The OAM packets can be associated with One-Way Active Measurement Protocol (OWAMP), and the measurements include determining a difference between a timestamp in the packet and a local time. The OAM packets can be associated with Two-Way Active Measurement Protocol (TWAMP), and the measurements include determining a local timestamp and providing the local timestamp in a reply. The OAM packets can be associated with Simple Two-Way Active Measurement Protocol (STAMP), and the measurements include determining a local timestamp and providing the local timestamp in a reply.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8 is a flowchart of a process for in-band telemetry for Segment Routing over Internet Protocol version 6 (SRv6) Traffic Engineering (TE) tunnel segments, such as using One-Way Active Measurement Protocol (OWAMP), Two-Way Active Measurement Protocol (TWAMP), Simple Two-Way Active Measurement Protocol (STAMP), and the like.

DETAILED DESCRIPTION OF THE DISCLOSURE

Again, the present disclosure relates to systems and methods for in-band telemetry for SRv6-TE tunnel segments, such as using OWAMP, TWAMP, STAMP, and the like. The present disclosure provides telemetry information (e.g., delay, latency, packet loss, etc.) for each SRv6 segment of a SRv6-TE tunnel using a single request packet initiated by sender. The approach described herein:

(1) utilizes the O-Flag in the SRH header without any change in forwarding-plane of receiver nodes.

(2) introduces only one global OAM reflector configuration for each transit node.

(3) can use any protocol, e.g., OWAMP, TWAMP, STAMP, etc., for telemetry generation and transmission back to initiator node, while simultaneously allowing other independent mechanisms to use the generated telemetry database.

With the conventional approach, OAM measurements are only available on a tunnel wide basis, i.e., between endpoints. The approach described herein provides a more granular measurement for individual segments and in-between segments in the end-to-end SRv6-TE path (or tunnel), allowing a Path Computation Engine (PCE) more flexibility in TE activities. The approach described herein does not require additional OAM test sessions for obtaining delay-measurement information from intermediate segment nodes, i.e., a single OAM packet can be used to measure all segments. Conversely, the approach described herein achieves low resource utilization at the initiator node by using a single OAM request packet from initiator node to receive data measurements for all segment nodes, i.e., compared to approaches with traceroute where multiple messages are sent.

Example Network

Figure 1:
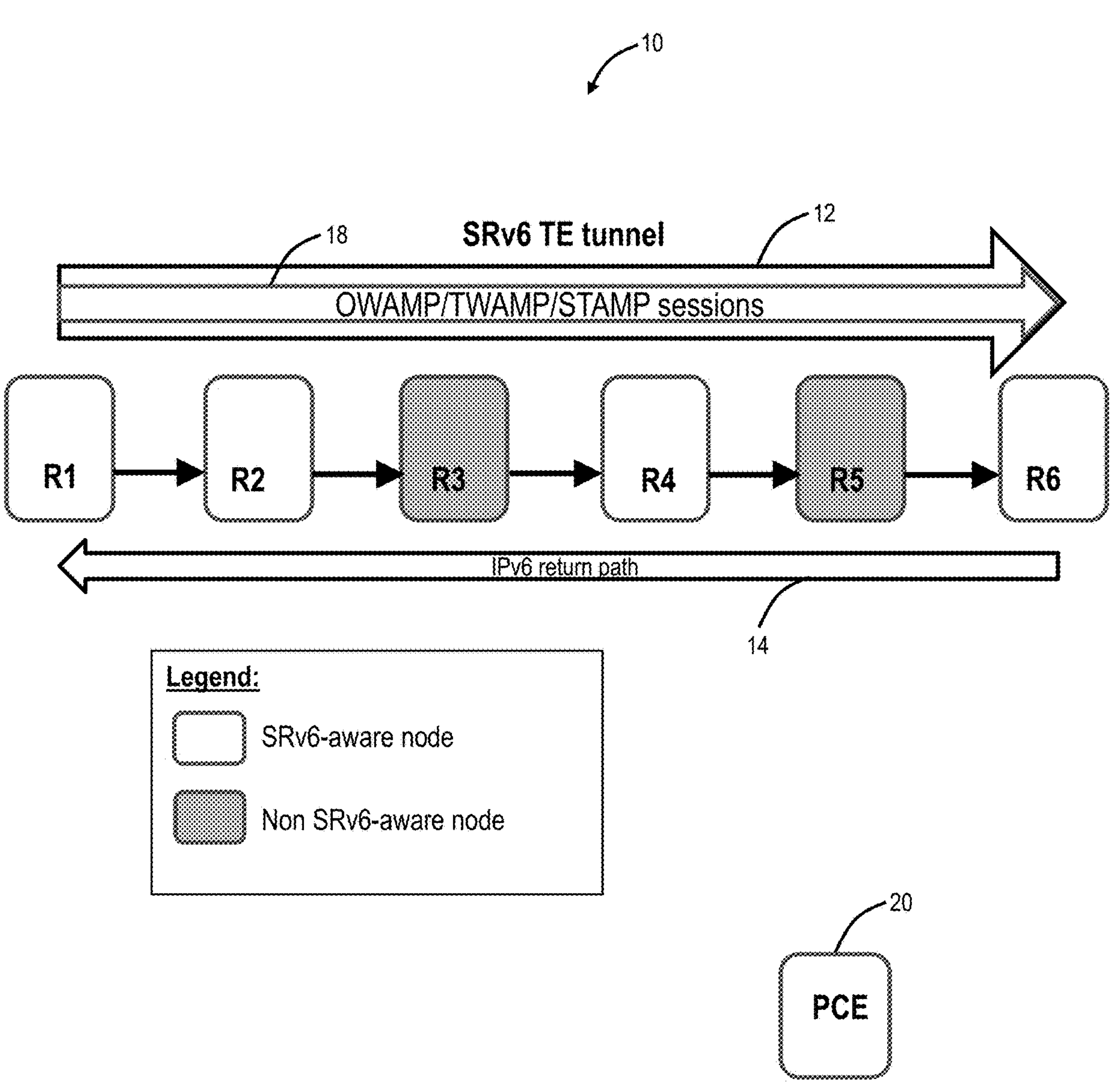
FIG. 1 is a network diagram of a network for illustrating the in-band telemetry for a SRv6-TE tunnel.

FIG. 1 is a network diagram of a network 10 for illustrating the in-band telemetry for a SRv6-TE tunnel 12. The network 10 includes six nodes, labeled R1-R6, and, for illustration purposes, the nodes R1, R2, R4, R6 are SRv6-aware, whereas the nodes R3, R5 are non-SRv6-aware nodes. The SRv6-TE tunnel 12 is from the node R1 to the node R6, and there is an IPV6 return path 16. That is, SR tunnels are unidirectional. There is also an OAM session 18 configured over the SRv6-TE tunnel 12. The OAM session 18 can utilize OWAMP, TWAMP, STAMP, or the like. Further, the network 10 includes a PCE 20 which is responsible for computing paths for traffic through the network 10. In Segment Routing, the PCE computes and maintains (i.e., traffic engineering) SRv6-TE tunnels including the SRv6-TE tunnel 12, based on network conditions, policies, and constraints.

Generally, Segment Routing simplifies and enhances how traffic is routed in the network 10. The concept of SRv6-TE tunnels and policies are central to its operation. SRv6-TE Tunnels are paths through the network 10 that are explicitly defined using Segment Routing. These paths are engineered to meet specific requirements, such as minimizing latency, avoiding congested links, or adhering to certain administrative policies. Thus, OAM measurements are key. In Segment Routing, the path that a packet takes through the network 10 is determined by a list of segments (i.e., instructions) encoded into the packet header, the SRH. The SRv6-TE tunnel 12 specifies a precise route for traffic to follow, leveraging these segments. This can involve specifying certain nodes or links that the traffic must traverse or avoid. The SRv6-TE tunnel 12 is used when there is a need for precise control over the path traffic takes through the network 10. This is common in scenarios requiring optimization for performance, security, or compliance reasons.

Also, a Segment Routing Policy is a higher-level construct that defines a set of rules for how traffic should be treated within the network 10. It can specify one or more candidate paths, which could be SRv6-TE tunnels, for the traffic to take based on various criteria (e.g., destination, type of service). SRv6-TE tunnels offer fine-grained control over the exact path of traffic through the network 10, while Segment Routing Policies provide a more flexible, criteria-based approach to routing decisions. SRv6-TE tunnels are primarily focused on defining specific paths for traffic engineering purposes. In contrast, Segment Routing Policies are used to implement broader network policies and objectives, potentially utilizing SRv6-TE tunnels as one of several tools to achieve these goals. In summary, SRv6-TE tunnels are about specifying exact paths through the network 10 for traffic engineering purposes, while Segment Routing Policies are about applying broader network policies, potentially using SRv6-TE tunnels among other mechanisms to route traffic according to these policies.

Segment Routing can also be applied to the IPV6 architecture, with the SRH, as defined in RFC 8754, "IPV6 Segment Routing Header (SRH)," March 2020, the contents of both are incorporated by reference. A segment is encoded as an IPV6 address. An ordered list of segments is encoded as an ordered list of IPV6 addresses in the SRH. The segment to process at any point along the path through the network 10 is indicated by a pointer in the routing extension header. In Segment Routing, a path includes segments which are instructions a node executes on an incoming packet. For example, segments can include forwarding the packet according to the shortest path to the destination, forwarding through a specific interface, or delivering the packet to a given application/service instance. Each Segment can be represented by a Segment Identifier (SID). Note, we may use the terms segment and SID interchangeably herein, and those skilled in the art will appreciate a segment is the actual pair of nodes and associated interfaces in the network whereas the SID is an identification thereof.

Conventional OAM Measurements

In FIG. 1, there is the OAM session between the nodes R1, R6, and this will provide OAM measurements over the entire SRv6-TE tunnel 12. There is no approach to get OAM measurements at the hop level, without installing and operating multiple OAM sessions, i.e., between the nodes R1, R2, the nodes R1, R4, and the nodes R1, R6. Note, in our example, the nodes R3, R5 are not SRv6 aware. As such, any segment here includes the nodes R3, R5 as intermediate nodes. Thus, it is possible to get the per hop (segment) granular OAM measurements, but this requires significant resources, configuration, etc. Specifically, the network 10 is simplified for illustration purposes with actual networks being orders of magnitude more in scale. The objective is to support a minimal OAM measurement process, namely a single request packet, whereby all of the intermediate nodes R2, R4 can participate, even though the single request packet is sent from the initiator node R1 to the receiver node R6. That is, we refer to the node R1 as the initiator node R1, the node R6 as the receiver node R6, and the nodes R2, R4 as intermediate or transit nodes. Note, conventionally, the nodes R2, R4 do not process the payload of any OAM packet as it is being sent from the initiator node R1 to the receiver node R6.

Thus, conventionally, the OAM measurement is between the nodes R1, R6 at the level of the entire SRv6-TE tunnel 12. The present disclosure addresses an approach to get a per hop (segment) measurement with a single OAM request packet. That is, a minimal OAM measurement approach that maximizes measurement granularity.

Example OAM Measurement Protocols

OWAMP, TWAMP, and STAMP are three example OAM measurement protocols used herein. Those skilled in the art will recognize other protocols are also contemplated. OWAMP (One-Way Active Measurement Protocol), TWAMP (Two-Way Active Measurement Protocol), and STAMP (Simple Two-way Active Measurement Protocol) are network performance measurement protocols designed to assess and monitor the quality of service (QOS) in the network 10. Each has its own unique features and use cases, aimed at measuring metrics such as latency, loss, and jitter, which are critical for maintaining high network performance. OWAMP is described in RFC 4656 September 2006, TWAMP is described in RFC 5357 October 2008, and STAMP is described in RFC 8762 March 2020, the contents of each are incorporated by reference in their entirety.

OWAMP is designed to measure one-way metrics such as latency and packet loss from a source to a destination without requiring the path back from the destination to the source to be the same or measured. OWAMP uses a pair of test packets sent from the sender to the receiver to measure one-way characteristics. It requires synchronized clocks between the source and destination to accurately measure one-way delay. OWAMP is particularly useful in applications where asymmetric routing occurs (where the forward and reverse paths differ) and for measuring one-way QoS parameters that are critical in real-time applications.

TWAMP extends OWAMP to measure round-trip network performance metrics. It can measure two-way or round-trip latency, packet loss, and jitter, offering a more comprehensive view of network performance. TWAMP includes two parts: a control protocol to set up test sessions and a test protocol for sending and reflecting test packets for round-trip measurement. It does not necessarily require synchronized clocks due to its round-trip measurement nature. TWAMP is suitable for general network performance monitoring and troubleshooting, providing insights into round-trip path characteristics which are important for most internet applications.

STAMP is a simplified version of TWAMP, designed for lightweight and scalable two-way network performance measurement. It aims to provide similar functionalities to TWAMP but with reduced complexity and resource requirements. STAMP uses a simplified session establishment process compared to TWAMP and employs packet timestamping for measuring two-way metrics. It is designed to be easily deployable on a wide range of devices, including those with limited computational capabilities. STAMP is ideal for environments where device resources or network bandwidth are limited, such as in IoT (Internet of Things) networks or other constrained environments, while still requiring the ability to measure two-way network performance metrics.

OWAMP measures one-way traffic performance, while both TWAMP and STAMP are focused on two-way or round-trip measurements. OWAMP and TWAMP are more complex and may require more resources for accurate time synchronization (especially OWAMP), whereas STAMP is designed to be simpler and more resource-efficient, suitable for constrained environments.

SRH and the O-Flag

The O-Flag is a specific bit within the SRH. The SRH is an optional extension header in IPV6 that enables Segment Routing. It contains a list of segments (represented as IPv6 addresses) that the packet should traverse. This approach allows for flexible and efficient routing decisions without the need for complex signaling protocols traditionally used in MPLS (Multiprotocol Label Switching) networks.

The O-Flag is dedicated to Operations, Administration, and Maintenance (OAM) purposes. When set, it indicates that the packet requires special OAM processing by the nodes it traverses. This can include diagnostics, performance measurement, and other network management tasks that are crucial for maintaining network health and efficiency. With the present disclosure, the nodes R2, R4, R6 can recognize the O-Flag in an OAM measurement packet, and with this flag set, perform the designated OAM operations on this packet. The presence of the O-Flag does not alter the packet's forwarding path through the network; instead, it triggers the OAM processes at the nodes that are equipped to handle them. The actual routing of the packet continues to be determined by the list of segments in the SRH.

Using OWAMP, TWAMP, and STAMP Using the O-Flag

In various embodiments, we propose to address granular OAM measurement using OWAMP, TWAMP and STAMP protocols running over SRv6-TE path, using the O-Flag in the SRH header. Since these protocols are generally handled in the control-plane, we propose to have the O-Flag enabled only for periodic OAM measurement packets from the initiator node R1, to avoid packet drops on transit/responder nodes R2, R4 due to any rate-limits for received O-Flag enabled packets. Again, the network 10 is a generic SRv6 network topology with the SRv6-TE tunnel 12 from the node R1 to the node R6, with a normal IPV6 return path 14 from the node R6 to the node R1. This SRv6-TE tunnel 12 traverses both SRv6-aware and SRv6-unaware transit nodes.

A global OAM reflector configuration is performed for the nodes R2, R4, R6, to handle received OWAMP/TWAMP/STAMP packets for any sessions, such as the OAM session 18. The initiator node R1 sets the O-Flag in SRH header in OAM packets periodically, for the configured session 18. These packets are forwarded transparently by SRv6-unaware transit nodes R3, R5.

The SRv6-aware transit nodes R2, R4, R6 include functionality to recognize the O-Flag and perform associated functionality. In particular, the forwarding plane of the nodes R2, R4, R6 nodes is configured to:

(1) create a copy of the received packet to an OAM module, as part of O-Flag processing.

(2) add a receive (RX) timestamp to the packet and punt to OAM module.

(3) forward the original packet to the next hop along the SRv6-TE tunnel 12.

As part of the OAM processing of the punted packet, each of the transit and responder nodes add RX and transmit (TX) timestamps, and add telemetry information to a session database, according to a pre-configured format (e.g., using IP Flow Information Export (IPFIX), Packet Sampling (PSAMP), etc.). This information can be fetched and collated by an OAM fetch-client or other modules to pass the telemetry information to the user or a central-controller, such as the PCE 20. As described herein, the OAM module, OAM fetch-client, etc. include hardware configured to implement functions, such as via software, firmware, etc.

Simultaneously, for TWAMP and STAMP, protocol reply packets containing the sender TX, receiver RX and timestamps are transmitted back to the node R1 via the IPV6 return path 14. The node R1 receives the reply to packets with the same sequence-number from the nodes R2, R4 and R6 and adds them to a telemetry database for the OAM session 18 for the full forward SRv6-TE tunnel 12.

Both classic and micro-SID addresses for Penultimate Segment Pop (PSP) and Ultimate Segment Pop (USP) SRv6-TE tunnel are supported by this approach.

OWAMP Delay Measurement of Segments with SRv6 O-Flag

Figure 2:
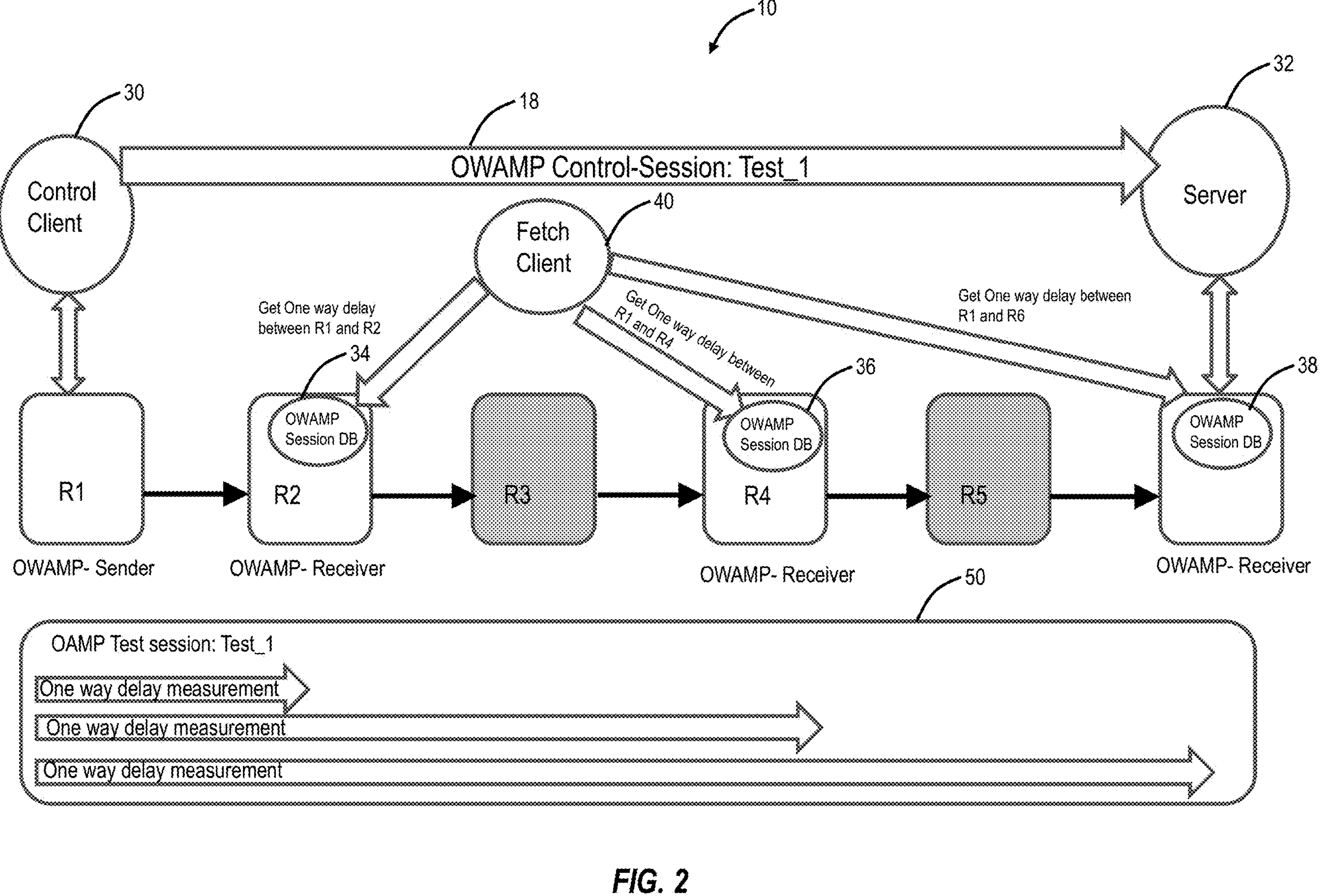
FIG. 2 is a network diagram of the network illustrating the OAM session as an OWAMP delay measurement, using the SRv6 O-Flag.
Figure 3:
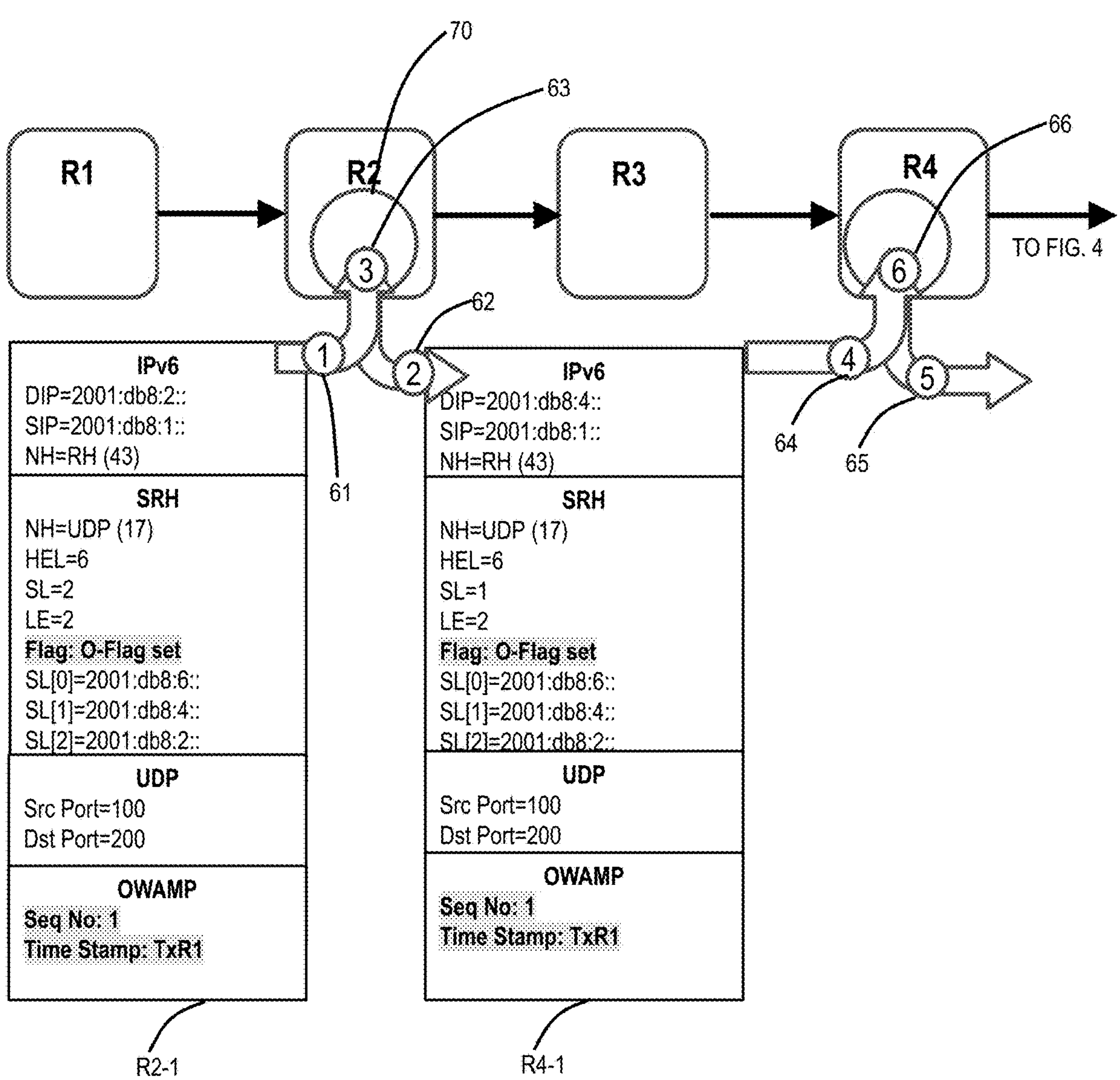
FIGS. 3 and 4 are a diagram of portions of the network illustrating an example operation of the OWAMP delay measurement, using the SRv6 O-Flag.
Figure 4:
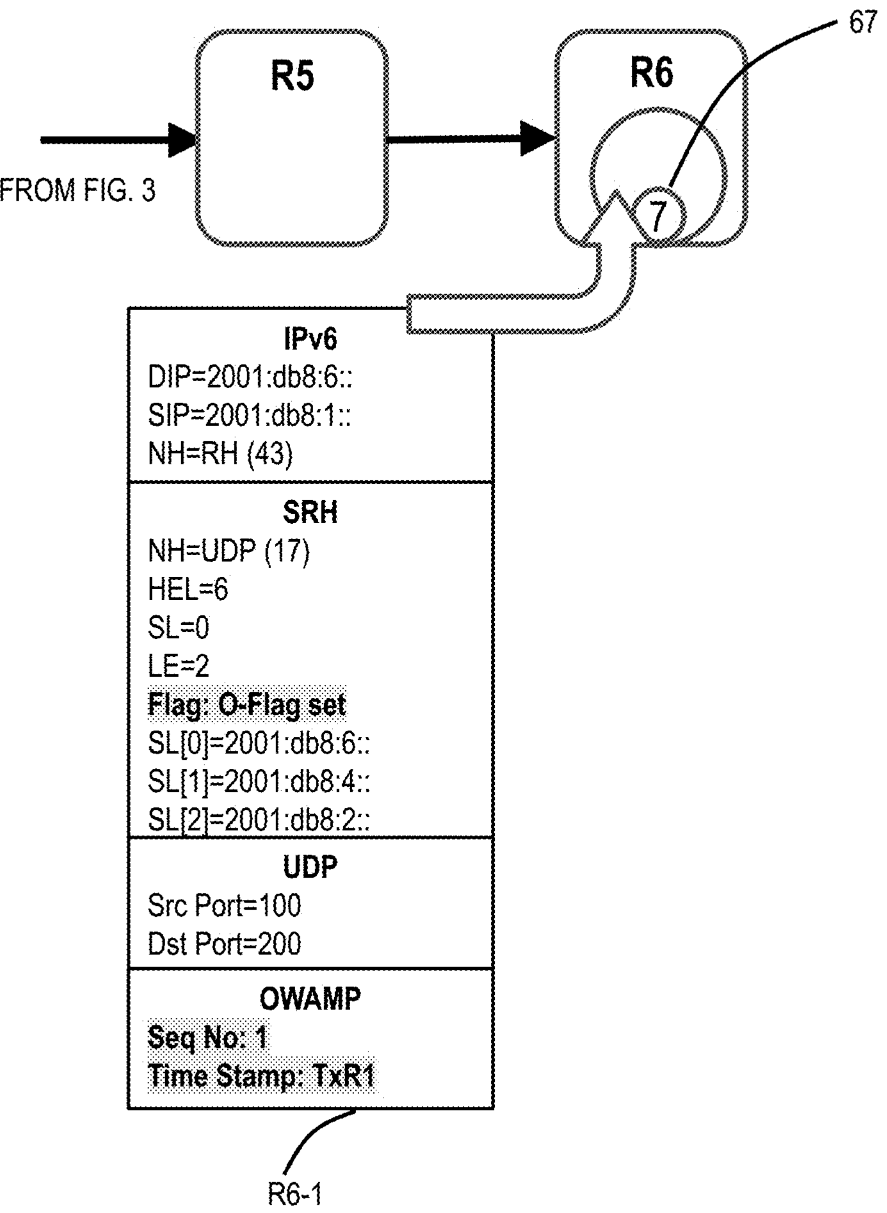

FIG. 2 is a network diagram of the network 10 illustrating the OAM session 18 as an OWAMP delay measurement, using the SRv6 O-Flag. FIGS. 3 and 4 are a diagram of portions of the network 10 illustrating an example operation of the OWAMP delay measurement, using the SRv6 O-Flag. There is a control client 30 at the initiator node R1, and a server 32 at the receiver node R6, as part of the OAM session 18. There are OWAMP session databases 34, 36, 38, at the nodes R2, R4, R6, respectively. Also, there is a fetch client 40 that is configured to obtain data from the OWAMP session databases 34, 36, 38 for purposes of maintaining the OAM results. The fetch client 40 can be part of the PCE 20, a Network Management System (NMS), a Software Defined Networking (SDN) controller, etc. Generally, the clients 30, 40, the server 32, and the databases 34, 36, 38 include functionality implemented by some combination of hardware (e.g., processing circuitry) along with software, firmware, etc.

For an example OAM test session 18, an OAM packet is sent from the node R1 to the node R6, with the O-Flag enabled, and the OAM packet is an OWAMP request packet, i.e., the payload with the SRH having the O-Flag enabled. The effect of this single OWAMP request packet with the SRH having the O-Flag enabled is to trigger one-way delay measurements at each of the nodes R2, R4, R6, with their results stored in the respective OWAMP session databases 34, 36, 38, and with the fetch client 40 configured to obtain the results to provide one way delay measurements from the node R1 to the node R2, from the node R1 to the node R4, and from the node R1 to the node R6, thereby supporting granular segment results.

FIGS. 3 and 4 illustrate an example operation and associated packet details for an OWAMP request packet being transmitted from the node R1 to the node R6 over the SRv6 TE tunnel 12. The tables in FIGS. 3 and 4 illustrate example details in the OWAMP request packet, structured by IPV6 information, the SRH, User Datagram Protocol (UDP) information, and payload for the OWAMP request packet. The IPV6 information includes an example destination IP (DIP) address, source IP (SIP) address, and a Next Header (NH) field, set to the Routing Header (RH) with a value of 43. The Routing header is used by an IPv6 source to list one or more intermediate nodes to be "visited" on the way to a packet's destination.

The SRH includes a NH field, set with a value of 17, designating this is a UDP. The SRH allows for the insertion of a list of segments (essentially, instructions or addresses) that a packet should traverse through the network. Here's a breakdown of the fields shown in FIGS. 3 and 4: Header Extension Length (HEL) which sets a length to enable parsing of the SRH, Segments Left (SL) which indicates how many segments are left for the packet to visit before it reaches its final destination, Last Entry (LE), to identify how many segments (or instructions) are included in the SRH, aiding in the processing of the segment list, Flags with the O-Flag set or enabled, and a Segment List from 0 to 2 (SL

[0], SL [1], SL [2]. The UDP information includes a Source (Src) port and Destination (Dst) Port. Finally, the OWAMP payload includes a sequence number (Seq. No.) and Time Stamp. All of these associated fields or values are shown in FIGS. 3 and 4 with example values.

At a step 61, an OWAMP test packet is sent from the initiator node R1 to the destination node R6, over the SRv6-TE tunnel 12, having all of the details shown in table R2-1. The OWAMP test packet is received at the node R2. At step 62, because the O-Flag is present in the SRH, upon receiving the OWAMP test packet, the node R2 is configured to make a mirror copy and send it to the next-hop based on the routing table. Concurrently, at step 63, an OAM module 70 in the node R2 performs delay measurements by processing the time stamp in the packet and updating the OWAMP receiver session database 34 which can be retrieved by the fetch client 40. Also, the associated OWAMP timestamp data can be used for further telemetry computation.

The node R3 does not process the OWAMP test packet, and it is received by the node R4. Steps 64, 65, 66 are the same as steps 61, 62, 63, with the different information in table R4-1. After the step 66, the node R5 does not process the OWAMP test packet, and it is received by the node R6. At step 67, the node R6 receives the OWAMP test packet, and it is processed with the information in table R6-1. The net effect is an OWAMP measurement at each of the nodes R2, R4, R6, based on the single OWAMP test packet, and triggered by the presence of the O-Flag.

TWAMP Delay Measurement of Segments with SRv6 O-Flag

Figure 5:
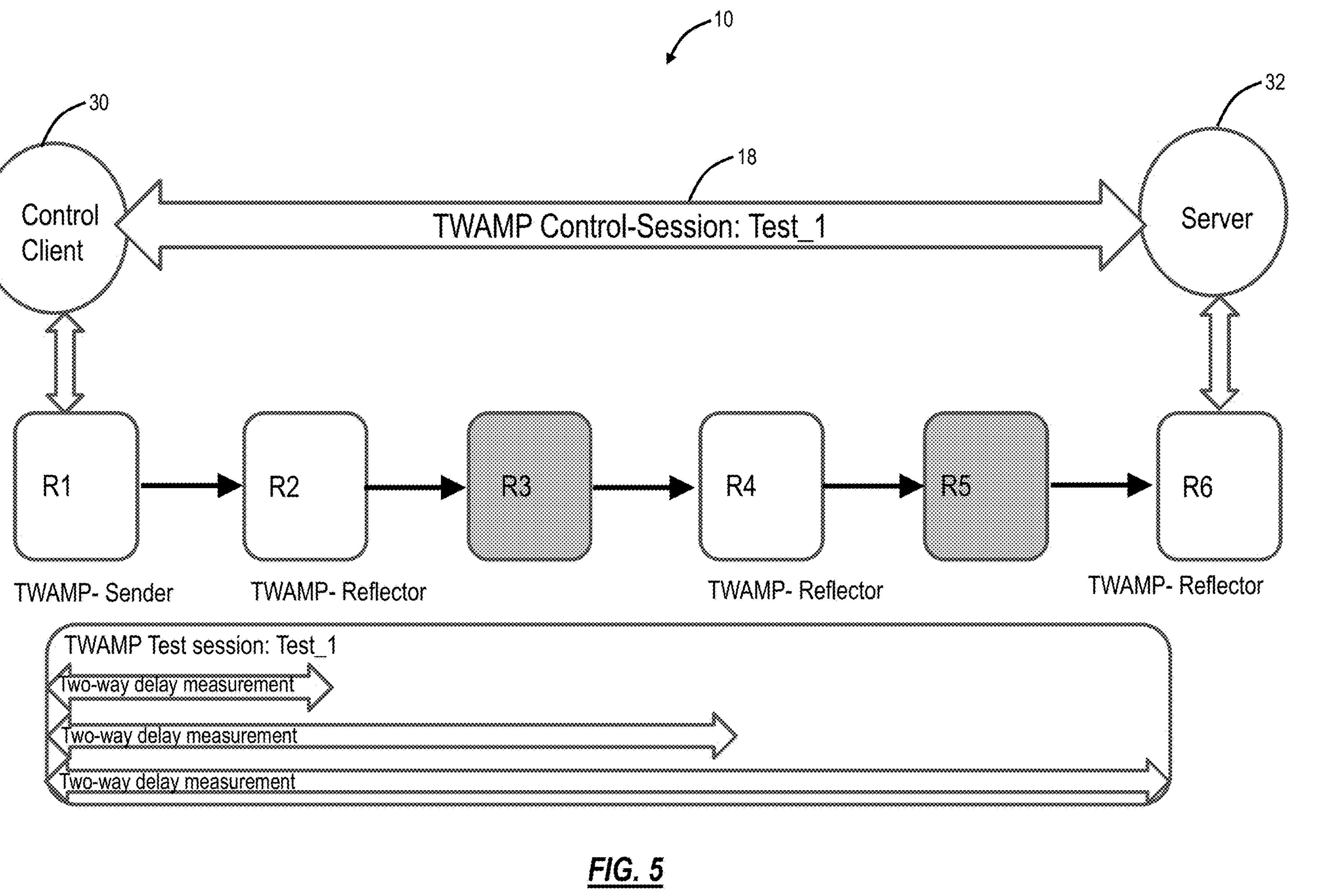
FIG. 5 is a network diagram of the network illustrating the OAM session as a TWAMP delay measurement, using the SRv6 O-Flag.
Figure 6:
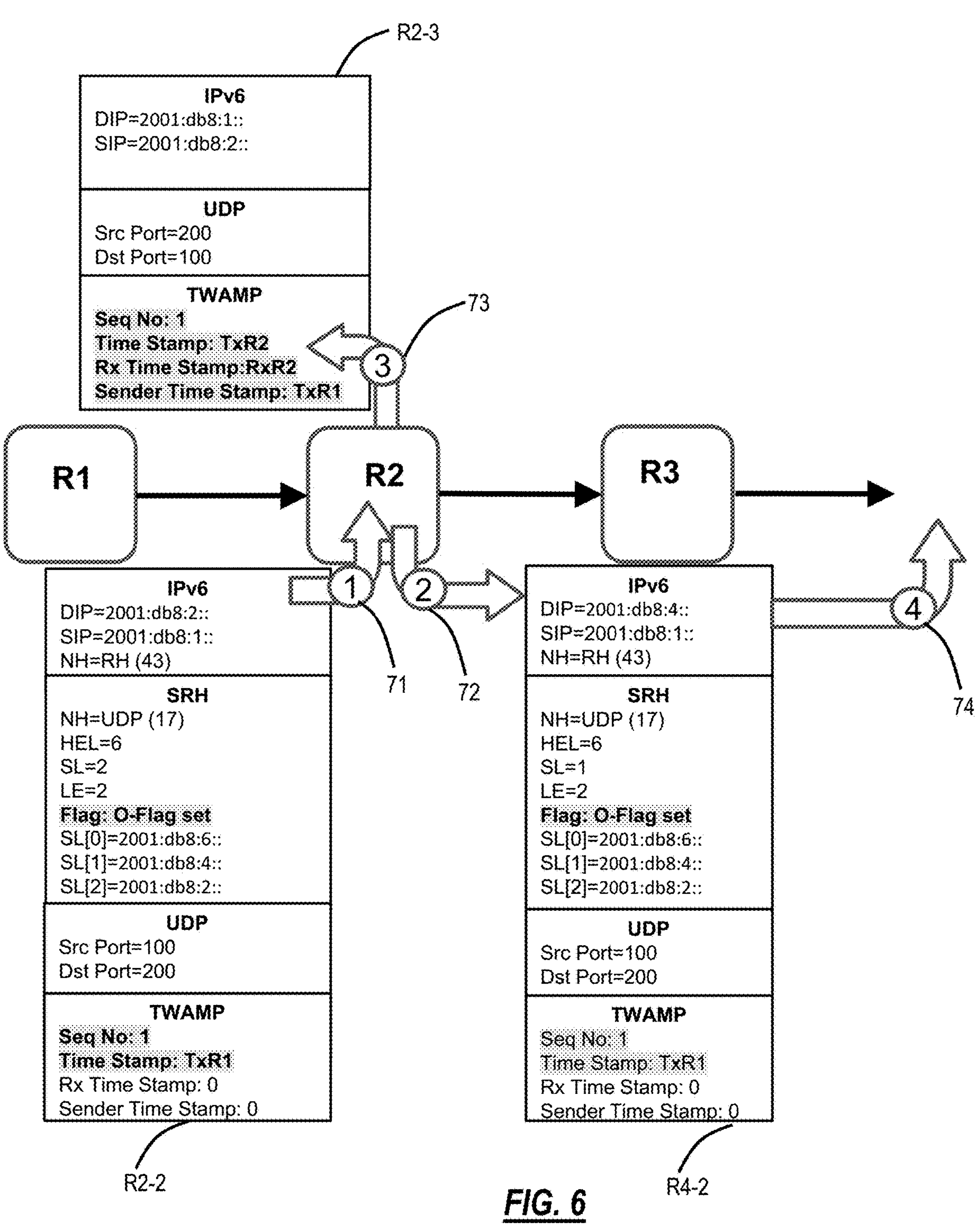
FIGS. 6 and 7 are a diagram of portions of the network 10 illustrating an example operation of the TWAMP delay measurement, using the SRv6 O-Flag.
Figure 7:
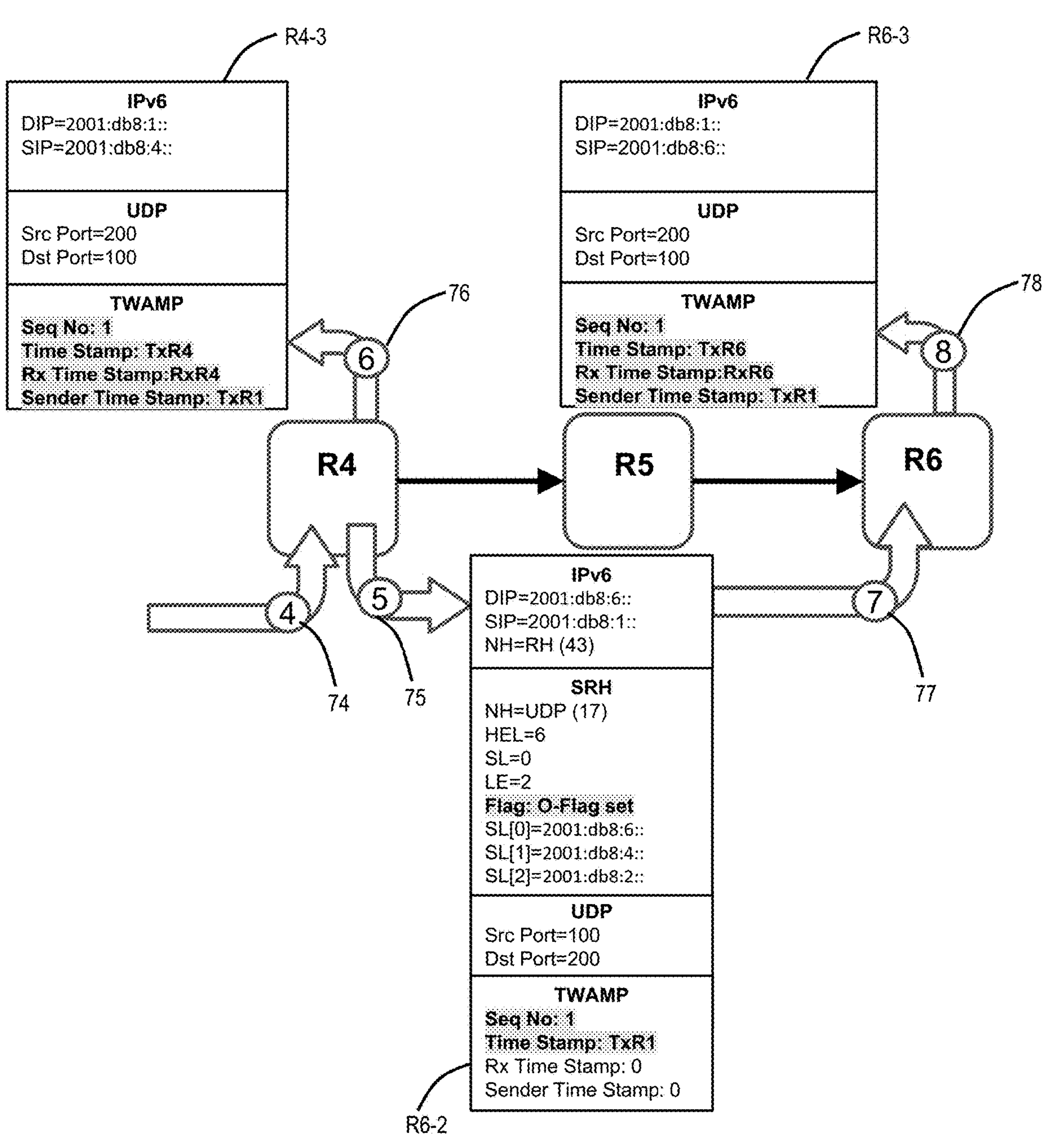

FIG. 5 is a network diagram of the network 10 illustrating the OAM session 18 as a TWAMP delay measurement, using the SRv6 O-Flag. FIGS. 6 and 7 are a diagram of portions of the network 10 illustrating an example operation of the TWAMP delay measurement, using the SRv6 O-Flag. This is similar to the OWAMP measurements in FIGS. 2, 3, and 4, but there are replies sent, i.e., it is a two-way delay measurement. Similar to FIG. 2, FIG. 5 includes the control client 30 and the server 32. The nodes R2, R4, R6 are configured as TWAMP reflectors whereas the node R1 is a TWAMP sender. Tables R2-2, R4-2, R6-2 contain similar information as tables R2-1, R4-1, R6-1, except the payload is a TWAMP request, with a sequence number, time stamp, Rx time stamp, and sender time stamp. Additionally, there are tables R2-3, R4-3, R6-3 for response transmissions, over the IPV6 return path 14, i.e., these do not include an SRH, but only the IPV6, UDP, and TWAMP information.

At step 71, the initiator node R1 sends a TWAMP test packet to the node R6, via the SRv6-TE tunnel 12, having all of the details shown in table R2-2. The TWAMP test packet is received at the node R2. At step 72, because the O-Flag is present in the SRH, upon receiving the TWAMP test packet, the node R2 is configured to make a mirror copy and send it to the next-hop based on the routing table. Concurrently, at step 73, the OAM module at the node R2 generates a TWAMP reply containing its own Rx and Tx timestamp and sends it back to the node R1 for subsequent Delay Measurement computations, based on the table R2-3. Also, the associated TWAMP timestamp data can be used for further telemetry computation.

The node R3 does not process the TWAMP test packet, and it is received by the node R4. Steps 74, 75, 76 are the same as steps 71, 72, 73, with the different information in tables R4-2, R4-3. After the step 76, the node R5 does not process the TWAMP test packet, and it is received by the node R6. At step 77, the node R6 receives the TWAMP test packet, and it is processed with the information in table R6-2. The net effect is an TWAMP measurement at each of the nodes R2, R4, R6, based on the single TWAMP test packet, and triggered by the presence of the O-Flag.

Process

Figure 8:
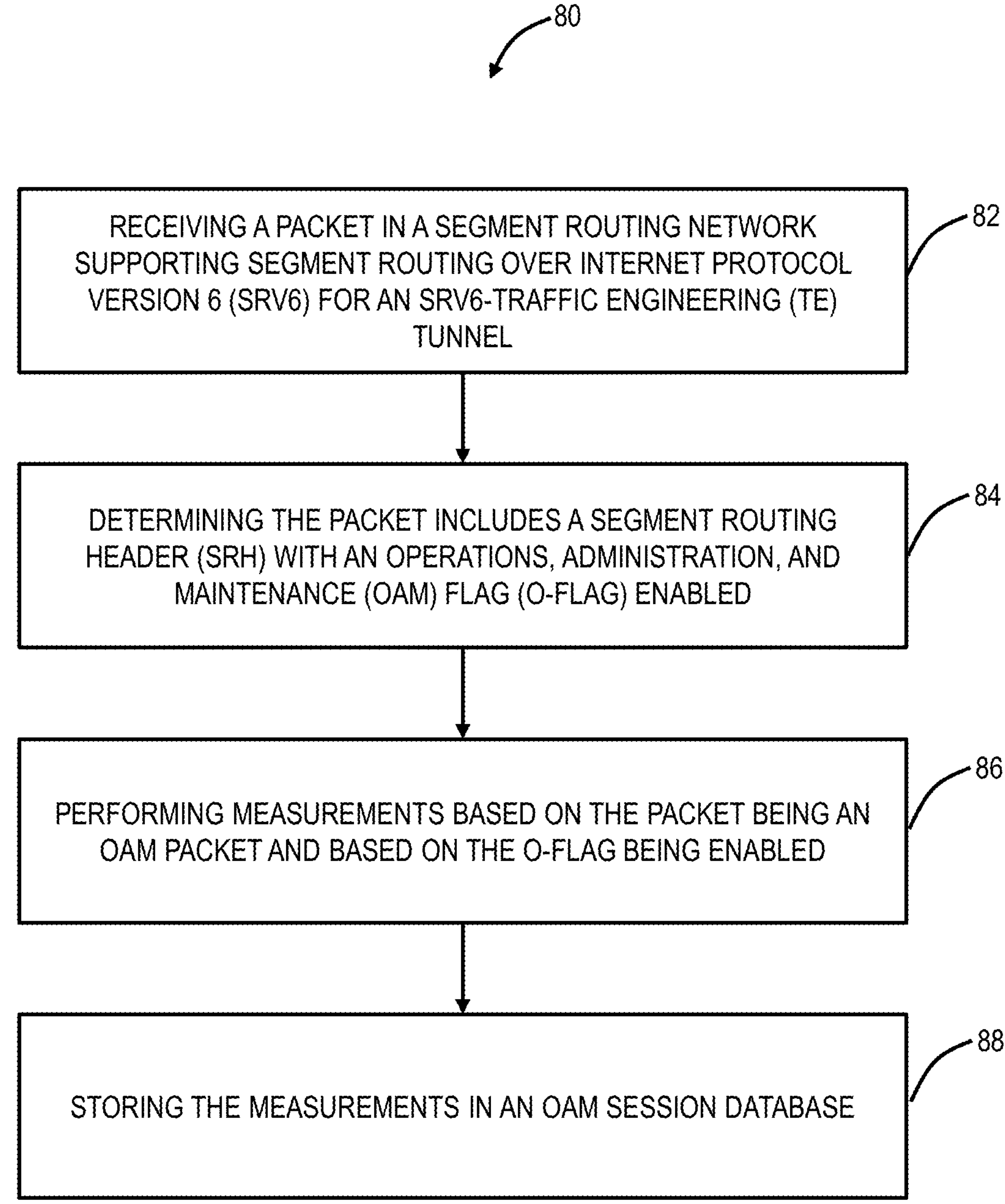

FIG. 8 is a flowchart of a process 80 for in-band telemetry for Segment Routing over Internet Protocol version 6 (SRv6) Traffic Engineering (TE) tunnel segments, such as using One-Way Active Measurement Protocol (OWAMP), Two-Way Active Measurement Protocol (TWAMP), Simple Two-Way Active Measurement Protocol (STAMP), and the like. The process 80 contemplates implementation as a method having steps, a node or circuitry configured to implement the steps, and as a non-transitory computer-readable medium storing instructions that, when executed, cause one or more processors to implement the steps.

The process 80 includes receiving a packet in a Segment Routing network supporting Segment Routing over Internet Protocol version 6 (SRv6) for an SRv6-Traffic Engineering (TE) tunnel (step 82); determining the packet includes a Segment Routing Header (SRH) with an Operations, Administration, and Maintenance (OAM) Flag (O-Flag) enabled (step 84); performing measurements based on the packet being an OAM packet and based on the O-Flag being enabled (step 86); and storing the measurements in an OAM session database (step 88).

The process 80 can include, subsequent to the determining and concurrent with the performing, transmitting a mirror copy of the packet to a next hop in the SRv6-TE tunnel. The process 80 can include transmitting a reply to the packet to an initiator node of the packet with information based on the measurements. The process 80 can include providing a response to a request to fetch the measurements or the information.

The packet can be associated with One-Way Active Measurement Protocol (OWAMP), and the measurements include determining a difference between a timestamp in the packet and a local time. The packet can be associated with Two-Way Active Measurement Protocol (TWAMP), and the measurements include determining a local timestamp and providing the local timestamp in a reply. The packet can be associated with Simple Two-Way Active Measurement Protocol (STAMP), and the measurements include determining a local timestamp and providing the local timestamp in a reply.

In another embodiment, a PCE can be configured to, based on Operations, Administration, and Maintenance (OAM) measurements in a Segment Routing network supporting Segment Routing over Internet Protocol version 6 (SRv6) for one or more SRv6-Traffic Engineering (TE) tunnels, receive information based on measurements over the one or more SRv6-Traffic Engineering (TE) tunnels, the measurements utilizes OAM packets with a Segment Routing Header (SRH) with an Operations, Administration, and Maintenance (OAM) Flag (O-Flag) enabled therein, and store and utilize the information for traffic engineering over the one or more SRv6-TE tunnels.

Example Node

Figure 9:
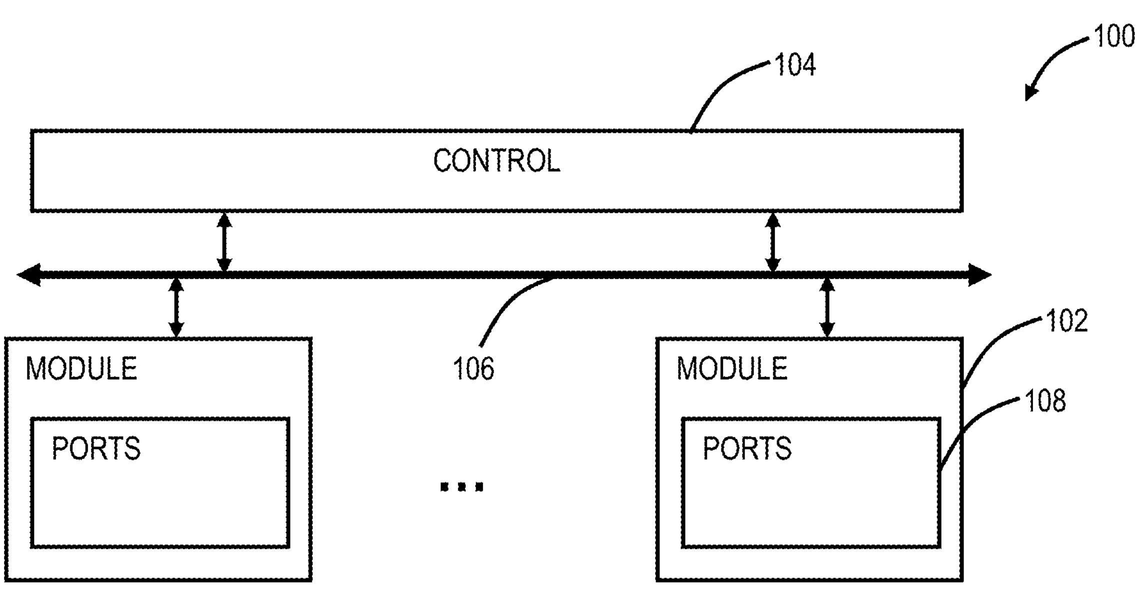
FIG. 9 is a block diagram of an example implementation of a router, such as any of the nodes in the networks of FIGS. 1-7.

FIG. 9 is a block diagram of an example implementation of a router 100, such as any of the nodes R1-R6. Those of ordinary skill in the art will recognize FIG. 9 is a functional diagram in an oversimplified manner, and a practical embodiment may include additional components and suitably configured processing logic to support known or conventional operating features that are not described in detail herein.

In an embodiment, the router 100 can be any network element or other implementations that support Segment Routing networking, include any of the nodes R1-R6 in the network 10. In this embodiment, the router 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 100 out by the correct port 108 to the next router 100. "Switching fabric" includes switching/routing units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 100. The network interface may be utilized to communicate with an element manager, a network management system, the PCE 30, etc. Additionally, the control module 104 can include a database that tracks and maintains provisioning, configuration, operational data, and the like.

Again, those of ordinary skill in the art will recognize the router 100 can include other components which are omitted for illustration purposes, and that the systems and methods described herein are contemplated for use with a plurality of different network elements with the router 100 presented as an example type of network element. For example, in another embodiment, the router 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 9 is meant to provide a functional view, and those of ordinary skill in the art will recognize actual hardware implementations may vary.

Example Processing Device

Figure 10:
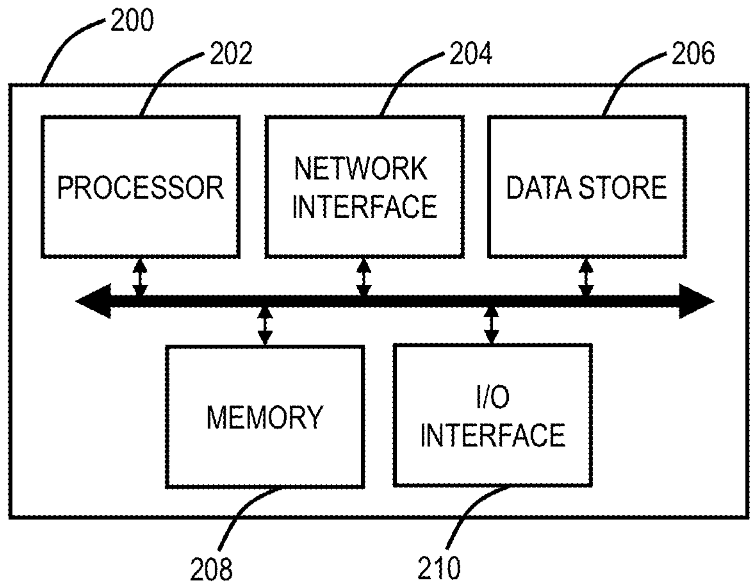
FIG. 10 is a block diagram of an example processing device.

FIG. 10 is a block diagram of an example processing device 200. The processing device 200 can be part of the router 100, or a stand-alone device communicatively coupled to the router 100, such as the PCE 20, etc. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, or the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any volatile memory elements, e.g., random access memory (RAM, such as DRAM, SRAM, SDRAM, and the like), nonvolatile memory elements (e.g., ROM, hard drive, flash drive, CDROM, and the like), and combinations thereof.

Moreover, the data store 206 can incorporate electronic, magnetic, optical, and/or other types of storage media. The memory 208 can include any volatile memory elements, e.g., random access memory (RAM, such as DRAM, SRAM, SDRAM, etc.), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A node configured to operate in a Segment Routing network supporting Segment Routing over Internet Protocol version 6 (SRv6), the node comprising circuitry configured to:

receive a packet in a Segment Routing network supporting Segment Routing over Internet Protocol version 6 (SRv6) for an SRv6-Traffic Engineering (TE) tunnel, determine the packet includes a Segment Routing Header (SRH) with an Operations, Administration, and Maintenance (OAM) Flag (O-Flag) enabled, responsive to the O-Flag being enabled, generate a mirror copy of the packet to cause multiple instances of the packet, and forward one of the instances of the packet to a next hop in the SRv6-TE tunnel while providing another of the instances of the packet to an OAM module, subsequent to the determination the SRH has the O-Flag enabled and concurrent with forwarding of the one of the instances of the packet to the next hop, generate a reply to an initiator node of the packet including one or more locally determined timestamps associated with the measurements, perform measurements based on the packet being an OAM packet and based on the O-Flag being enabled by processing the other of the instances of the packet in the OAM module including adding a receive timestamp, and store the measurements in an OAM session database associated with the SRv6-TE tunnel for the node.

2. The node of claim 1, wherein the circuitry is further configured to transmit a reply to an initiator node of the packet with information based on the measurements.

3. The node of claim 1, wherein the circuitry is further configured to provide a response to a request to fetch the measurements or information based thereon.

4. The node of claim 1, wherein the packet is associated with One-Way Active Measurement Protocol (OWAMP), and the measurements include determining a difference between a timestamp in the packet and a local time.

5. The node of claim 1, wherein the packet is associated with one of (1) Two-Way Active Measurement Protocol (TWAMP) and (2) Simple Two-Way Active Measurement Protocol (STAMP), and the measurements include determining local timestamps and providing the local timestamps in a reply.

6. The node of claim 1, wherein the node is an intermediate node in the SRv6-TE tunnel.

7. A method comprising steps of:

receiving a packet in a Segment Routing network supporting Segment Routing over Internet Protocol version 6 (SRv6) for an SRv6-Traffic Engineering (TE) tunnel;

determining the packet includes a Segment Routing Header (SRH) with an Operations, Administration, and Maintenance (OAM) Flag (O-Flag) enabled;

responsive to the O-Flag being enabled, generating a mirror copy of the packet to cause multiple instances of the packet, and forwarding one of the instances of the packet to a next hop in the SRv6-TE tunnel while providing another of the instances of the packet to an OAM module;

subsequent to the determining and concurrent with forwarding of the one of the instances of the packet to the next hop, generate a reply to an initiator node of the packet including one or more locally determined timestamps associated with the measurements;

performing measurements based on the packet being an OAM packet and based on the O-Flag being enabled by processing the other of the instances of the packet in the OAM module including adding a receive timestamp; and storing the measurements in an OAM session database associated with the SRv6-TE tunnel for the node.

8. The method of claim 7, wherein the steps further include transmitting a reply to an initiator node of the packet with information based on the measurements.

9. The method of claim 7, wherein the steps further include providing a response to a request to fetch the measurements or information based thereon.

10. The method of claim 7, wherein the packet is associated with One-Way Active Measurement Protocol (OWAMP), and the measurements include determining a difference between a timestamp in the packet and a local time.

11. The method of claim 7, wherein the packet is associated with one of (1) Two-Way Active Measurement Protocol (TWAMP) and (2) Simple Two-Way Active Measurement Protocol (STAMP), and the measurements include determining local timestamps and providing the local timestamps in a reply.

12. The method of claim 7, wherein the method is implemented in an intermediate node in the SRv6-TE tunnel.

13. A non-transitory computer-readable medium storing instructions that, when executed, cause one or more processors to:

based on Operations, Administration, and Maintenance (OAM) measurements in a Segment Routing network supporting Segment Routing over Internet Protocol version 6 (SRv6) for one or more SRv6-Traffic Engineering (TE) tunnels, receive information based on measurements over the one or more SRv6-Traffic Engineering (TE) tunnels, the measurements utilizes OAM packets with a Segment Routing Header (SRH) with an Operations, Administration, and Maintenance (OAM) Flag (O-Flag) enabled therein, wherein, responsive to the O-Flag being enabled in a received packet for an SRv6-TE tunnel, the instructions further cause the one or more processors to generate a mirror copy of the packet to cause multiple instances of the packet, and forward one of the instances of the packet to a next hop in the SRv6-TE tunnel while providing another of the instances of the packet to an OAM module, perform measurements by processing the copy of the packet in the OAM module including adding a receive timestamp, and store the measurements in an OAM session database associated with the SRv6-TE tunnel, and subsequent to the determination the SRH has the O-Flag enabled and concurrent with forwarding of the one of the instances of the packet to the next hop, generate a reply to an initiator node of the packet including one or more locally determined timestamps associated with the measurements, and store and utilize the information for traffic engineering over the one or more SRv6-TE tunnels.

14. The non-transitory computer-readable medium of claim 13, wherein the OAM measurements include, at intermediate nodes along the one or more SRv6-TE tunnels, performing a measurement and concurrently transmitting a mirror copy of an OAM packet to a next hop in the one or more SRv6-TE tunnels.

15. The non-transitory computer-readable medium of claim 13, wherein the OAM measurements include transmission of a reply to the packet to an initiator node of an OAM packet with information based on the measurements.

16. The non-transitory computer-readable medium of claim 13, wherein the OAM packets are associated with One-Way Active Measurement Protocol (OWAMP), and the measurements include determining a difference between a timestamp in the packet and a local time.

17. The non-transitory computer-readable medium of claim 13, wherein the OAM packets are associated with Two-Way Active Measurement Protocol (TWAMP), and the measurements include determining a local timestamp and providing the local timestamp in a reply.

18. The non-transitory computer-readable medium of claim 13, wherein the OAM packets are associated with Simple Two-Way Active Measurement Protocol (STAMP), and the measurements include determining a local timestamp and providing the local timestamp in a reply.

* * * * *